United States Patent
Kato et al.

(10) Patent No.: US 6,817,599 B2
(45) Date of Patent: Nov. 16, 2004

(54) VIBRATION DAMPING BUSHING

(75) Inventors: Kazuhiko Kato, Komaki (JP); Seiya Asano, Niwa-gun (JP)

(73) Assignee: Tokai Rubber Industries, Ltd., Komaki (JP)

( * ) Notice: Subject to any disclaimer, the term of this patent is extended or adjusted under 35 U.S.C. 154(b) by 0 days.

(21) Appl. No.: 10/446,331

(22) Filed: May 27, 2003

(65) Prior Publication Data

US 2003/0222384 A1 Dec. 4, 2003

(30) Foreign Application Priority Data

May 28, 2002 (JP) ........................................ 2002-154668

(51) Int. Cl.[7] .................................................. F16F 7/00
(52) U.S. Cl. .................................. 267/141.2; 267/140
(58) Field of Search ............................. 267/141.2, 140, 267/141.1, 141.3, 141.4, 141.5, 141.6, 141.7; 384/147, 151, 152, 153, 215, 220, 222

(56) References Cited

U.S. PATENT DOCUMENTS

| | | | | |
|---|---|---|---|---|
| 4,530,491 A | * | 7/1985 | Bucksbee et al. | 267/141 |
| 4,767,108 A | * | 8/1988 | Tanaka et al. | 267/140.12 |
| 5,139,244 A | * | 8/1992 | Chakko | 267/293 |

FOREIGN PATENT DOCUMENTS

| | | | |
|---|---|---|---|
| DE | 0493731 A1 | * | 7/1992 |
| DE | 0955482 A2 | * | 11/1999 |
| DE | 1008781 A2 | * | 6/2000 |
| EP | 1293365 A2 | | 7/2002 |
| JP | 03090408 A | * | 4/1991 |
| JP | 5-164163 | | 6/1993 |
| JP | 7-286634 | | 10/1995 |
| WO | WO02/073052 A1 | | 9/2002 |

* cited by examiner

*Primary Examiner*—Pam Rodriguez
(74) *Attorney, Agent, or Firm*—Beyer Weaver & Thomas LLP

(57) ABSTRACT

Disclosed is a vibration damping bushing comprising: an inner and outer sleeve fixable to a first and a second component, respectively; an elastic body having a tubular main body portion interposed between the inner and outer sleeves and a pair of flange portions integrally formed at axial end portions of the main body portion, which extends radially outwardly and is laminated on axial end faces of the outer sleeve; and a deformation resistant portion provided for at least one flange portion over a given circumferential length, projecting axially outwardly to be opposed to a member of the first component with a spacing therebetween. Due to radial compressive deformation of the main body portion, the flange portion undergoes elastic deformation toward the member of the first component so that the deformation resistant portion comes into contact with the member of the first component to increase resistance to the radial compressive deformation of the main body portion.

11 Claims, 6 Drawing Sheets

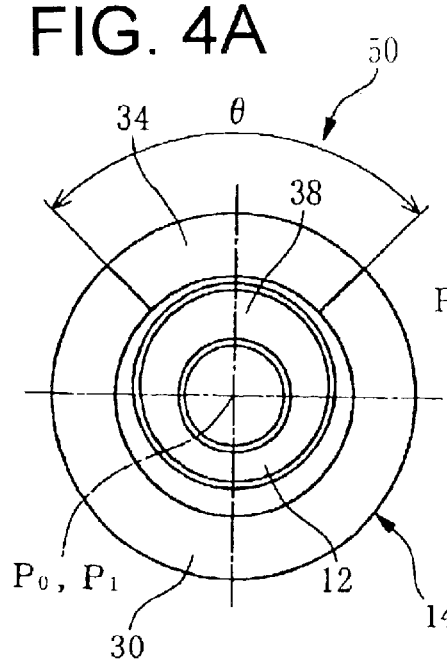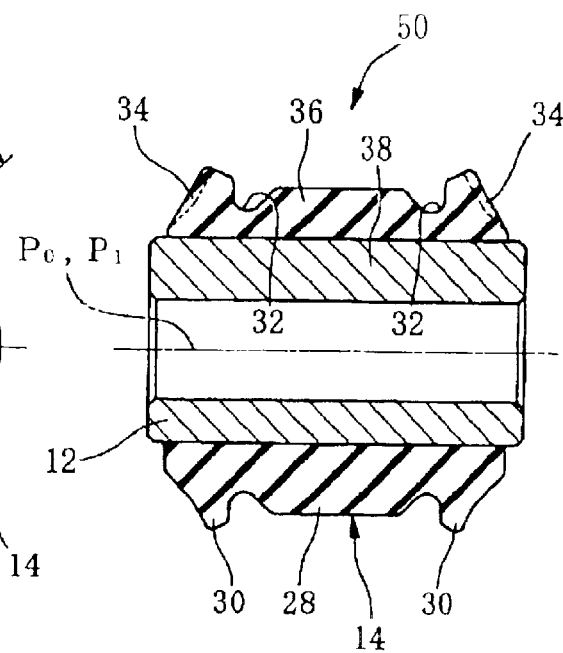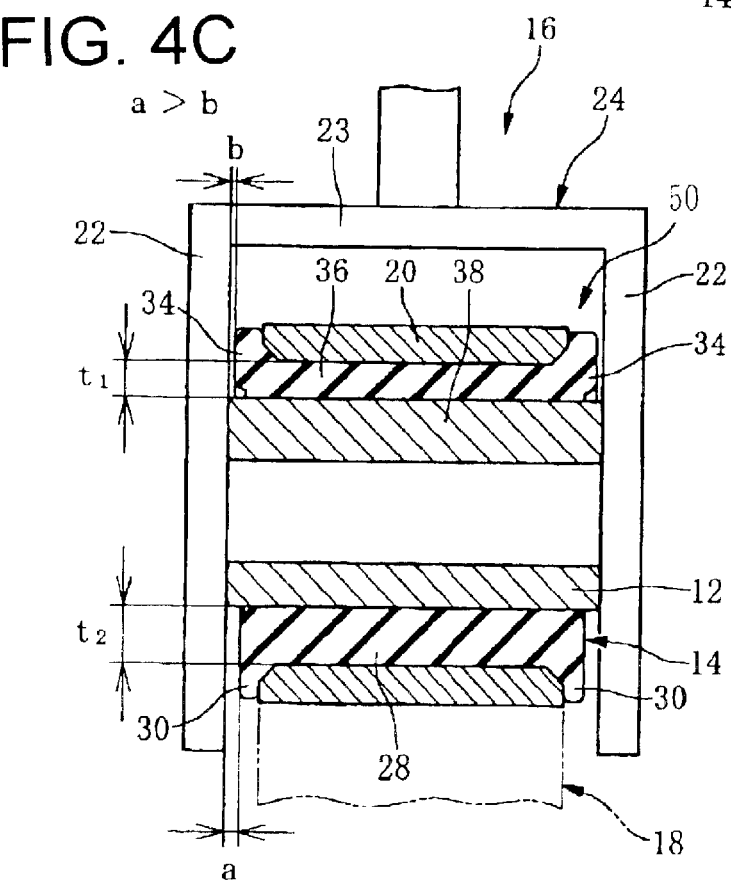

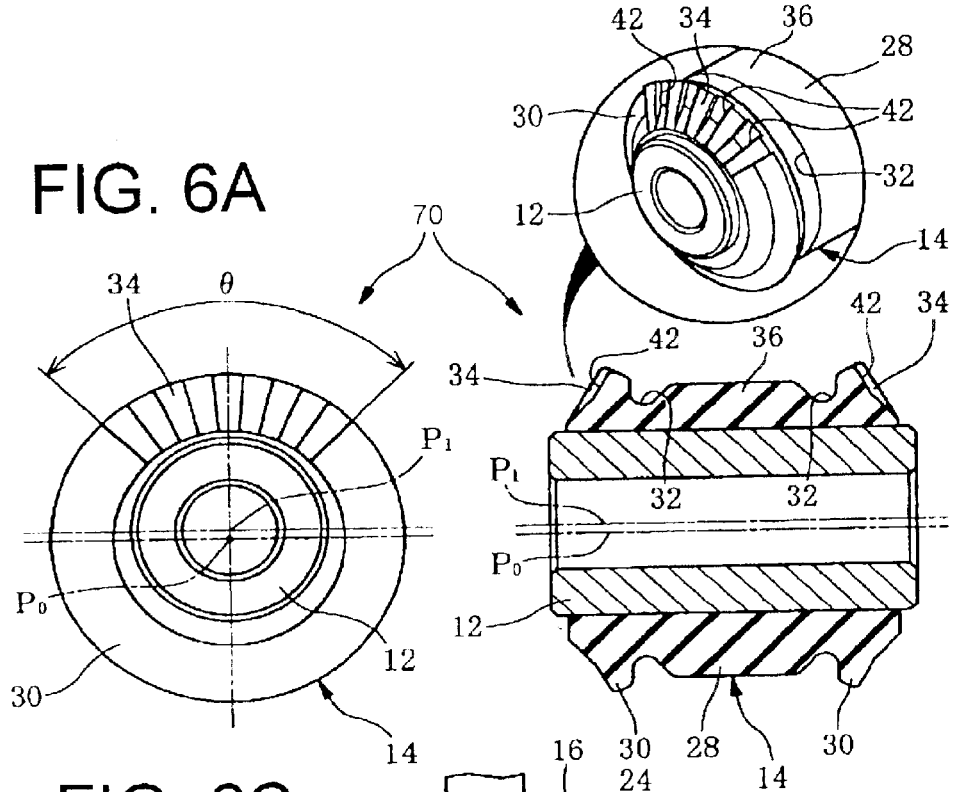
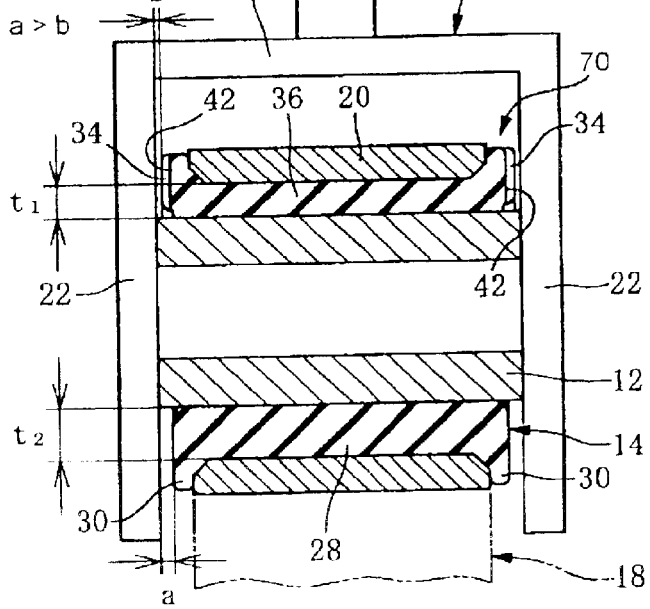

VIBRATION DAMPING BUSHING

INCORPORATED BY REFERENCE

The disclosure of Japanese Patent Application No. 2002-154668 filed on May 28, 2002 including the specification, drawings and abstract is incorporated herein by reference in its entirety.

BACKGROUND OF THE INVENTION

1. Field of the Invention

The present invention relates to vibration damping bushings for use in a part connecting a suspension with a body of an automotive vehicle, or the like, and more particularly relates to such a vibration damping bushing configured to exhibit relatively hard spring characteristics in a radial direction at a specific circumferential position.

2. Description of the Related Art

A vibration damping bushing of this kind typically includes a tubular elastic body interposed between a rigid inner sleeve and a rigid outer sleeve. The inner and outer sleeves are respectively affixed to one and the other of two components that are to be linked together, e.g., a suspension and a body of an automotive vehicle.

Where the inner sleeve, outer sleeve, and elastic body are of uniform shape all the way around their circumference, a vibration damping bushing of this kind may exhibit spring characteristics uniform in every radial direction. More specifically, the spring characteristics of the vibration damping bushing caused by elastic deformation of the elastic body in radial directions will be uniform, for all the cases whether the inner sleeve undergoes upward, downward, rightward and leftward displacements relative to the outer sleeve, for example.

However, a vibration damping bushing of this kind may be desired, for example, to have hard spring characteristics when the inner sleeve undergoes upward displacement relative to the outer sleeve, and to have soft spring characteristics when it undergoes downward displacement, or to have hard spring characteristics when undergoing rightward displacement and soft spring characteristics when undergoing displacement in the opposite leftward direction. Namely, the vibration damping bushing may be required, depending on the location at which the vibration damping bushing will be used, to exhibit spring characteristics being hard in a radial direction located at a specific circumferential position, while being soft in an opposite radial direction or some other radial directions.

To meet this requirement, there have been a considerable number of proposals to provide the elastic body with hollow portions (through holes) or to modify the shape of the hollow portions. FIG. 7 shows an example of such a conventional bushing, i.e., a vibration damping bushing 200, as disclosed in JP-A-7-286634.

The vibration damping bushing 200 as shown in FIG. 7 is of so-called inner/outer sleeve-bonded type in which a tubular elastic body 206 is bonded to a rigid inner sleeve 202 and outer sleeve 204. The elastic body 206 is provided with hollow portions (through holes) 208, 210 situated at respective positions above and below the inner sleeve 202. The hollow portions 208, 210 differ in shape from each other. As a result, the vibration damping bushing 200 exhibits different spring characteristics in opposite radial directions, depending on whether the inner sleeve 202 undergoes upward displacement or downward displacement relative to the outer sleeve 204.

In a vibration damping bushing of this inner/outer sleeve-bonded type, it is a relatively simple matter to make radial spring characteristics thereof differ between, for example, the upward direction and the downward direction, by forming hollow portions like those described above or modifying the shape of the hollow portions.

Also known are press fit type bushings, which do not have an outer sleeve at the time when the elastic body is molded, instead, the bushing is assembled by press fitting the elastic body at its outer circumferential surface into a tubular part provided to one of the two components, e.g., a suspension arm. In this case, it is difficult for the bushing to make radial spring characteristics hard in a specific direction and soft in another direction by forming hollow portions through the elastic body or modifying the shape of the hollow portions. The reason is that the presence of such hollow portions in an elastic body makes it difficult to assure adequate bonding force by means of press fitting.

SUMMARY OF THE INVENTION

It is therefore one object of this invention to provide a vibration damping bushing whose radial spring characteristics is made hard at a desired circumferential position.

The above and/or optional objects of this invention may be attained according to at least one of the following modes of the invention. Each of these modes of the invention is numbered like the appended claims and depending from the other mode or modes, where appropriate, to indicate possible combinations of elements or technical features of the invention. It is to be understood that the principle of the invention is not limited to these modes of the invention and combinations of the technical features, but may otherwise be recognized based on the teachings of the present invention disclosed in the entire specification and drawings or that may be recognized by those skilled in the art in the light of the present disclosure in its entirety.

(1) A vibration damping bushing for connecting a first and a second component in a vibration damping fashion, comprising: (a) a rigid inner sleeve fixable to a first component; (b) a rigid outer sleeve fixable to a second component; (c) an elastic body having a main body portion of tubular configuration interposed between said inner and outer sleeves; (d) a pair of flange portions integrally formed at opposite axial end portions of said main body portion, extending radially outwardly and laminated on opposite axial end faces of said outer sleeve, respectively; and (e) a deformation resistant portion provided for at least one of said pair of flange portions over a given circumferential length, said deformation resistant portion projecting axially outwardly to be opposed to a member of said first component with a spacing therebetween, wherein said flange portion undergoes elastic deformation toward said member of said first component due to compressive deformation of said main body portion in radial directions perpendicular to an axial direction of said bushing so that said deformation resistant portion comes into contact with said member of said first component to increase deformation resistance of said elastic body.

According to this mode of the invention, a vibration damping bushing is configured such that the flange portion is caused to deform towards the member of the first component by means of compressive deformation of the main body portion in radial directions, and a portion of the flange extending over the predetermined range in the circumferential direction thereof constitutes the deformation resistant portion. In this vibration damping bushing, when the inner sleeve undergoes displacement relative to the outer sleeve toward the side provided with the deformation resistant portion, in other words, when the main body undergoes compressive deformation on the side where the deformation resistant portion is provided, the deformation resistant portion is forced to come into contact with the member of the first component, thus creating strong deformation resistance. As a result, increased is compressive deformation resistance in the main body portion, making the spring characteristics of the vibration damping bushing harder at a specific circumferential position, namely at the portion provided with the deformation resistant portion. It should be noted that the member of the first component includes the first component itself, a bracket to be fixed to the first component for fixedly mounting the inner sleeve on the first component, and other members fixed to the first component.

Preferably, at least one of the pair of flange portions has an axial wall thickness that is made large at a predetermined circumferential position thereof over the given circumferential length so as to provide the deformation resistant portion protruding axially outwardly beyond an axial end face of the at least one of the pair of flange portions.

(2) A vibration damping bushing according to the above-indicated mode (1), wherein the vibration damping bushing is of press fit type in which the elastic body is press fitted and secured at an outer circumferential surface thereof to an inner circumferential surface of the outer sleeve.

Advantages of the invention according to this mode can be well enjoyed at a vibration damping bushing of press fit type rather than of inner/outer sleeve-bonded type.

(3) A vibration damping bushing according to the above-indicated mode (1) or (2), wherein the deformation resistant portion is provided with a recess open in protruding end faces thereof.

According to the present invention, the deformation resistant portion may have the same axial wall thickness over its entire circumference, or alternatively may have the axial wall thickness vary in its circumferential direction, which may be embodied by forming the recess open in the protruding end faces of the deformation resistant portion according to this mode (3). In the former case, the deformation resistant portion comes into contact with the member of the first component over a substantially entire area of its protruding end face. In the latter case, however, the part of the deformation resistant portion comes into contact with the member of the first component, effectively eliminating or reducing possibility of ocurrence of noises generated upon abutting contact of the deformation resistant portion against the bracket, which would be caused by the overall contact of the deformation resistant portion against the bracket, or rubbing of the deformation resistant portion against the bracket. It is also possible to form a plurality of recesses onto the deformation resistant portion. In this case, the recesses may be arranged in the circumferential direction of the flange portion in regular intervals.

(4) A vibration damping bushing according to any one of the above-indicated modes (1)–(3), wherein a radial wall thickness of the main body portion of the elastic body is made small on a side where the deformation resistant portion is provided.

According to the mode (4) of the invention, the vibration damping bushing can exhibit hard spring characteristics at a specific radial direction lying on the circumferential position where the deformation resistant portion is provided.

(5) A vibration damping bushing according to the above-indicated mode (4), wherein a center axis of the inner sleeve is eccentric relative to a center axis of the elastic body toward the side provided with the deformation resistant portion so that the radial wall thickness of the main body portion of the elastic body is made small on the side provided with the deformation resistant portion.

This mode of the invention makes it facilitate to reduce the radial wall thickness of the main body portion of the elastic body on the side where the deformation resistant portion is provided, by simply offsetting the center of the inner sleeve relative to the center of the elastic body towards the deformation resistant portion provided side.

BRIEF DESCRIPTION OF THE DRAWINGS

The foregoing and/or other objects features and advantages of the invention will become more apparent from the following description of preferred embodiments with reference to the accompanying drawings in which like reference numerals designate like elements and wherein:

FIGS. 4A–4C are views corresponding to FIGS. 1A–1C showing a vibration damping bushing according to another preferred embodiment of the invention;

FIGS. 6A–6C are views corresponding to FIGS. 1A–1C showing a vibration damping bushing according to still another preferred embodiment of the invention.

DETAILED DESCRIPTION OF PREFERRED EMBODIMENTS

Figure 1A:
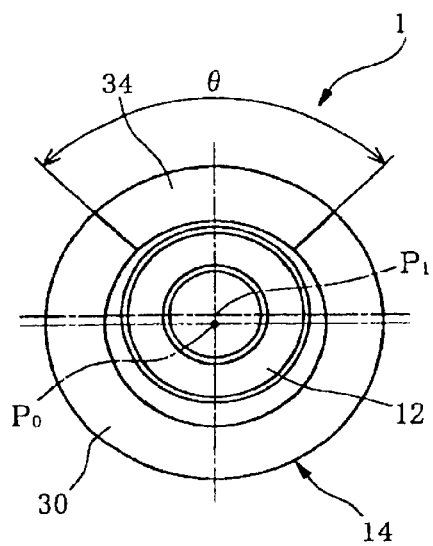
FIGS. 1A–1C show a vibration damping bushing according to one preferred embodiment of the invention in states of being molded, press-fitted and assembled.
Figure 1B:
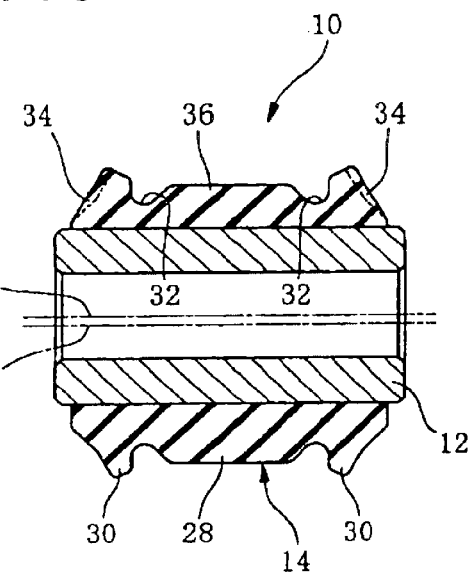
Figure 1C:
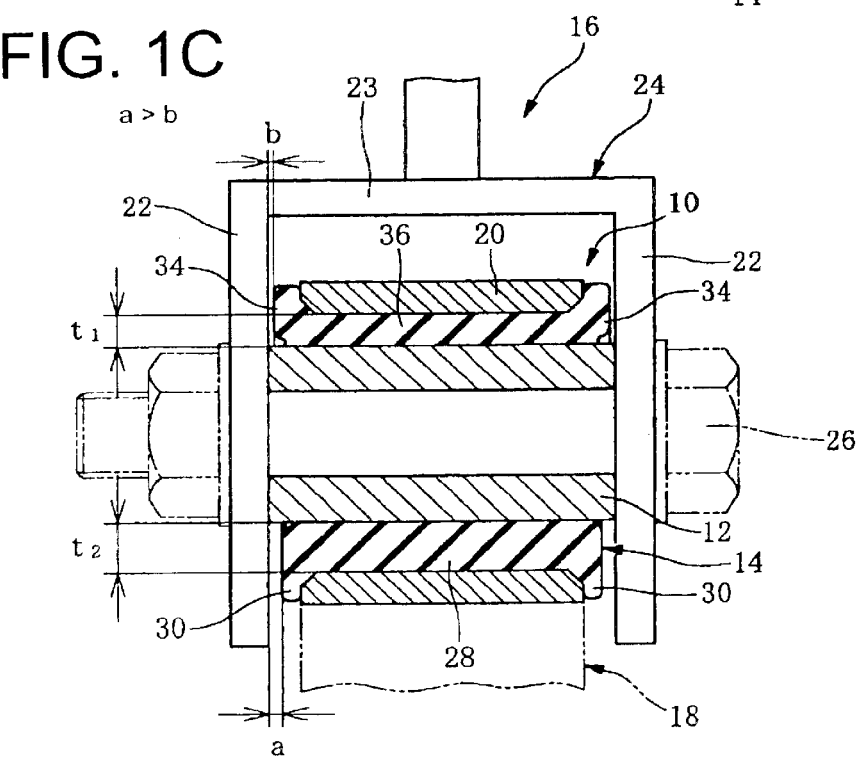
Figure 2:
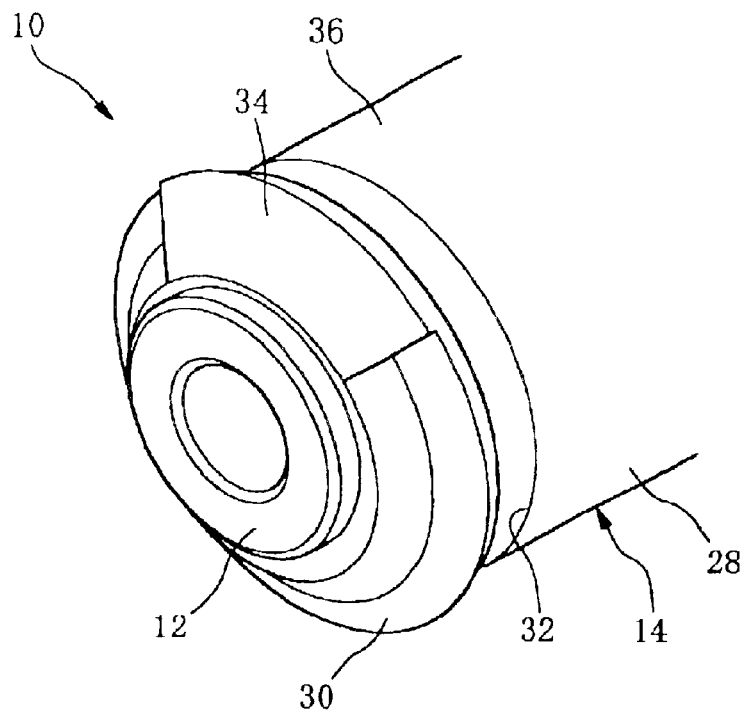
FIG. 2 is a perspective view of a principle part of the vibration damping bushing of FIG. 1.

FIGS. 1 and 2 show a vibration damping bushing 10 constructed according to one preferred embodiment of the invention. The vibration damping bushing has an inner sleeve 12 of rigid metal and an elastic body 14 integrally bonded about the inner sleeve 12 in the process of vulcanization of a rubber material for forming the elastic body 14.

The vibration damping bushing 10 of this embodiment is of press-fit type used, for example, in a connection portion of a suspension arm (a second component) and a body (a first component) of an automotive vehicle, as shown in FIG. 1C where 16 denotes a bracket fixed to the body of the vehicle and 18 denotes a suspension arm.

In the vibration damping bushing 10 of this example, the elastic body 14 is press-fitted at its outer circumferential surface into an outer sleeve in the form of a round tubular portion (collar) 20 of rigid metal, which is formed at one end portion of the suspension arm 18, so that the vibration damping busing 10 is fixed to the suspension arm 18 via the round tubular portion 20. It is noted that the elastic body 14 may be a non-compressible member made of NR (natural rubber) blended with BR (butadiene rubber) and/or SBR (styrene-butadiene rubber), for example.

The bracket 16, which is disposed on the side of the body of the vehicle, includes a retaining portion 24 of lying rectangular cup-shape, which has a pair of sandwiching support portions 22 and a connecting portion 23. The retaining portion 24 is fastened to the inner sleeve 12 by means of a bolt 26.

As shown in FIG. 1B, the aforesaid elastic body 14 has a main body portion 28 of round tubular shape, interposed between the inner sleeve 12 and the round tubular portion (outer sleeve) 20, and a pair of annular flange portions 30 formed at both axial ends thereof so as to project radially outwardly from the main body portion 28.

The main body portion 28 has annular recesses 32 concaved radially inwardly at the base of the annular flange portions 30, respectively. These recesses 32 are provided to facilitate compressive deformation of the main body portion 28 when vibration damping bushing 10 is press-fitted into the round tubular portion 20 of the suspension arm 18.

Each of the flange portions 30 provides a deformation resistant portion 34 extending over an angular range θ (e.g. 90° in this embodiment) in its circumferential direction, and located on the upper portion of the inner sleeve 12 as seen in FIG. 1A. An axial thickness of the deformation resistant portion 34 over the angular range θ is made larger than that in the other circumferential portion of the flange portion 30 by a given amount so that a protruding end face of the deformation resistant portion 34 projects axially outwardly beyond the other circumferential portion of the flange portion 30 by a distance equal to the difference in axial thickness between the deformation resistant portion 34 and the other flange portion 30. It should be noted that as molded, i.e. prior to being press-fitted, an axially outer end face of each flange portion 30 is a tapered face (see FIG. 1B), so that the direction in projection of deformation resistant portion 34 is, more specifically, perpendicular to the tapered face.

In this embodiment, a center axis $P_1$ of the inner sleeve 12 with a uniform radial thickness around its entire circumference is eccentric or offset by a predetermined dimension with respect to a center axis $P_0$ of elastic body 14, towards the up direction in the drawing, or more specifically towards the side provided with the deformation resistant portion 34. This means that a radial thickness of the main body portion 28 is made small at the portion provided with the deformation resistant portion 34 rather than at the other circumferential portion. 36 in FIG. 1 denotes the thin-radius portion of the main body portion 28.

The main body portion 28 has its thinnest radial thickness in the portion directly above center axis $P_1$ of inner sleeve 12 in FIG. 1A, and gradually increases in radial thickness moving downwardly therefrom in the circumferential direction, reaching maximum radial thickness directly below center axis $P_1$.

According to the vibration damping bushing 10 of this embodiment, with elastic body 14 press fitted into the round tubular portion 20, the part of the main body portion 28 that is straight in the axial direction, i.e., the portion lying between annular recesses 32, 32, is strongly pressed by the inside circumferential wall of the round tubular portion 20, and strongly constrained by the round tubular portion 20. At this time, due to compressive deformation of the main body portion 28, the flange portions 30 of the elastic body 14 deforms axially outwardly. In the completely press-fitted condition shown in FIG. 1C, the axial end faces of flange portions 30 are substantially oriented in the radially or upright direction approximately perpendicular to the axis of the vibration damping bushing 10, thereby being parallel to the surfaces of the sandwiching support portions 22 of the bracket 16.

As shown in FIG. 1C, in the completely press-fit condition, each flange portion 30 cooperates with the bracket 16, specifically, the corresponding sandwiching support portions 22, to form a gap in between. This gap is smaller in the portion provided with the deformation resistant portion 34, and relatively larger in the other portion. More specifically, the gap "b" between the deformation resistant portion 34 and the bracket 16 is smaller than the gap "a" between the bracket 16 and the other portion of the flange 30.

Where upward displacement of the inner sleeve 12 relative to the round tubular portion 20 is designated as "positive side" and downward displacement as "negative side", as seen in FIGS. 1A–1C, the vibration damping bushing 10 of this embodiment provides relatively hard spring characteristics on the positive side, while provides relatively soft spring characteristics on the negative side.

That is, during displacement of the inner sleeve 12 in a diametric direction perpendicular to the axial direction of the vibration damping bushing 10 and to the positive side (i.e., in the vertical upward direction as seen in FIGS. 1A–1C), the deformation resistant portion 34 of the flange portion 30 comes into abutting contact with the bracket 16 first, largely reducing or eliminating slip, i.e., deformation of the elastic body 14 in the axial direction at that time. This increases resistance to compressive deformation of the main body portion 28 at the positive side. Additionally, the main body portion 28 provides a thin walled portion 36 in the portion where deformation resistant portion 34 is provided, so that the vibration damping bushing 10 exhibits hard spring characteristics in this direction.

As is apparent from FIG. 1C, the gap a between each annular flange portion 30 and the bracket 16 is larger than the gap b, and the portion of the main body portion 28 shown at the bottom in FIG. 1C has a greater radial thickness. Therefore, during displacement of the inner sleeve 12 to the negative side, in other words, when the inner sleeve 12 undergoes downward displacement as seen in FIG. 1C relative to the round tubular portion 20, the vibration damping bushing 10 exhibits relatively soft spring characteristics in this diametric direction perpendicular to the axial direction thereof.

Figure 3:
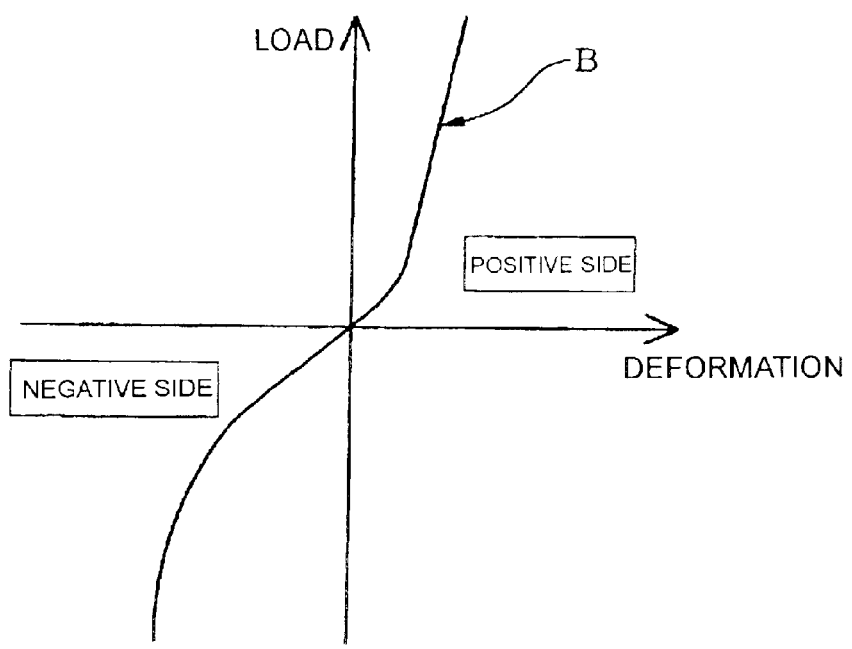
FIG. 3 is a graph showing spring characteristics of the vibration damping bushing of FIG. 1.

FIG. 3 shows a graph representing the above described spring characteristics of the vibration damping bushing 10, with deformation (flexure) plotted on the horizontal axis and load on the vertical axis. In FIG. 3, B denotes a curve of spring characteristics of the vibration damping bushing 10 in the vertical direction as seen in FIGS. 1A–1C.

According to the vibration damping bushing 10 of this embodiment, as described above, when the inner sleeve 12 undergoes displacement towards the side provided with the deformation resistant portion 34 relative to the round tubular portion 20, i.e., when the main body portion 28 undergoes compressive deformation at the side provided with the deformation resistant portion 34, a relatively high deformation resistance is created through contact of each deformation resistant portion 34 against the bracket 16. This increases compressive deformation resistance in the main body portion 28. Additionally, since the main body portion 28 takes the form of a thin walled portion 36 in the portion thereof provided with the deformation resistant portion 34, the spring characteristics of the vibration damping bushing 10 is hard in a specific radial direction lying on a circumferential portion on the side provided with the deformation resistant portion 34.

FIGS. 4A–4C illustrate a vibration damping bushing 50 constructed according to another embodiment of the present invention, where the bolt 26 is omitted for the sake of illustration simplicity only. In this embodiment, the center axis of the inner sleeve 12 (inside diameter center) P1 is not eccentric with respect to the center axis $P_0$ of the elastic body 14, but rather center axes $P_1$, $P_0$ are aligned, with the inner sleeve 12 given different radial thickness in the circumferential direction to form a thin-radius portion 36 in the main body portion 28. More specifically described, the portion directly above the center axis $P_1$ in the inner sleeve 12 in FIGS. 4A, 4B constitutes a thick walled portion 38, with radial thickness decreasing moving in the circumferential direction and downwardly therefrom, thereby forming a thin walled portion 36 in the main body portion 28. The advantages of this arrangement are substantially the same as with the embodiment shown in FIGS. 1A–1C.

Figure 5A:
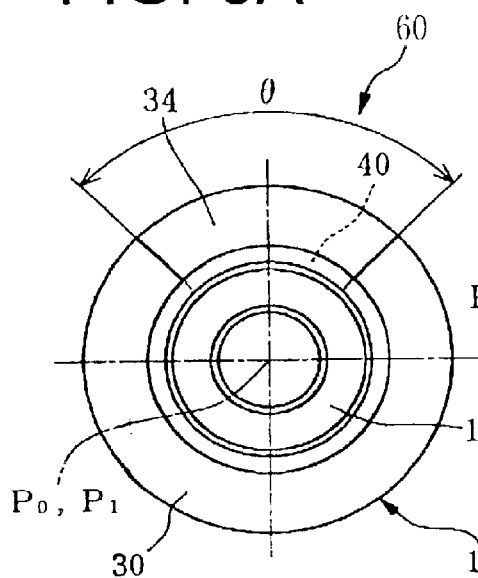
FIGS. 5A–5C are views corresponding to FIGS. 1A–1C showing a vibration damping bushing according to yet another preferred embodiment of the invention.
Figure 5B:
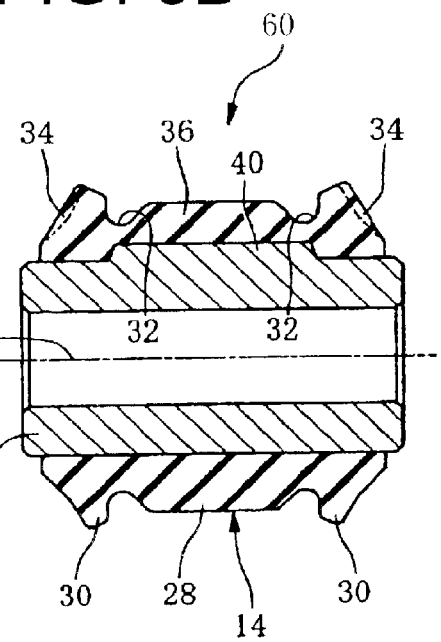
Figure 5C:
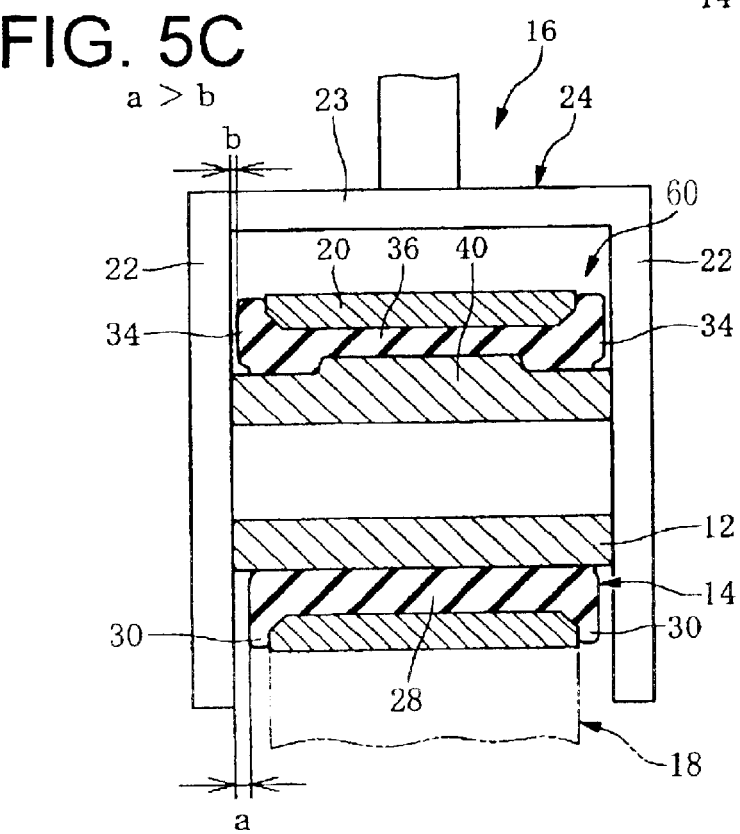
Figure 7A:
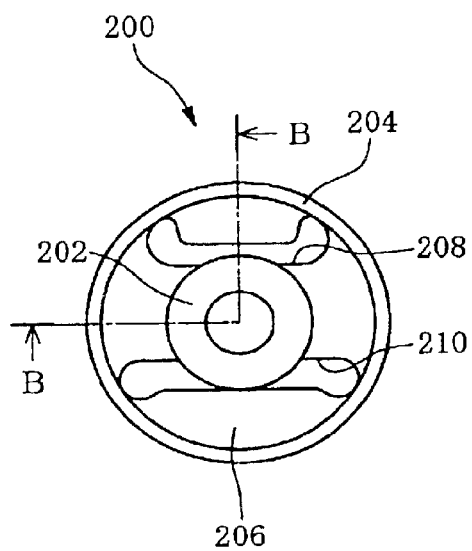
FIGS. 7A and 7B show an example of a conventional vibration damping bushing.
Figure 7B:
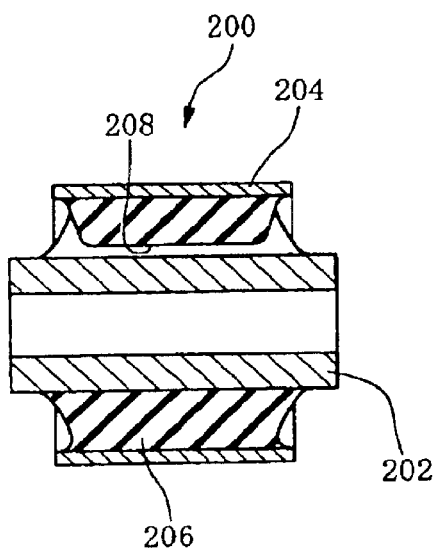

FIGS. 5A–5C illustrate a vibration damping bushing 60 constructed according to yet another embodiment of the present invention, where the illustration of the bolt 26 is also omitted for the above-described reasons. In the embodiment shown in FIGS. 4A–4C, the thick walled portion 38 is provided over the entire axial extension in the inner sleeve 12, whereas, in the present embodiment of FIGS. 5A–5C, an intermediate portion in the axial direction of the inner sleeve 12 constitutes a local thick walled portion 40, thereby forming the thin walled portion 38 in the main body portion 28.

In this regards, the inner sleeve 12 may, as in the embodiment of FIGS. 4A–4C, have its greatest radial thickness in the axially intermediate portion directly above the center $P_1$, and gradually decreasing radial thickness moving further away therefrom in the circumferential and downward directions. Alternatively, the radial thickness of the inner sleeve 12 may have localized greater over a range defined by an angle θ as shown by the dotted line in FIG. 5A.

FIGS. 6A–6C illustrate a vibration damping bushing 70 constructed according to yet another preferred embodiment of the invention, where the illustration of the bolt 26 is omitted for the above-described reasons. In this embodiment, the deformation resistant portion 34 is provided with a plurality of recessed portions 42, which are axially concaved and mutually spaced apart from each other at predetermined intervals in the circumferential direction of the annular flange portions 30, in order to bring the deformation resistance portion 34 into abutting contact with the bracket 16 at portions thereof rather than over its entirey. These portions lying between these recessed portions 42 constitute the thick walled portions. In this regards, the depth of the recessed portions 42 is arranged such that the radial thickness of each flange portion 30 in the portions provided with the recessed portions 42 is equal to the radial thickness in other portions, excepting the deformation resistant portion 34.

In this embodiment, since the deformation resistant portion 34 has formed therein a plurality of the recessed portions 42, the vibration damping bushing 70 can effectively eliminate or minimize a possibility of problems of contact of the deformation resistant portion 34 in its entirety against the bracket 16 and noises resulting from rubbing thereof, such as possibly occurs if the entire deformation resistant portion 34 has the same wall thickness in its entirety and is made to contact in its entirety against the bracket 16.

While the presently preferred embodiments of this invention have been described in detail for illustrative purpose only, it is to be understood that the present invention is not limited to the details of the illustrated embodiments, but may be embodied with various changes, modifications and improvements.

For instance, in the embodiments hereinabove, the deformation resistant portion 34 is provided over an angular range θ=90° to create relatively hard spring characteristics in the upward direction and relatively soft spring characteristics in the downward direction and left/right directions, namely to create hard spring characteristics principally in the upward direction. However, it would instead be possible in some instances for the deformation resistant portion 34 to constitute the upper half of the flange portion 30 as seen in FIGS. 1–6.

It is also to be understood that the present invention may be embodied with various other changes, modifications and improvements, which may occur to those skilled in the art, without departing from the spirit and scope of the invention defined in the following claims:

What is claimed is:

1. A vibration damping bushing for connecting a first and a second component in a vibration damping fashion, comprising:
   a rigid inner sleeve fixable to said first component;
   a rigid outer sleeve fixable to said second component;
   an elastic body having a main body portion of tubular configuration interposed between said inner and outer sleeves;
   a pair of flange portions integrally formed at opposite axial end portions of said main body portion, extending radially outwardly and laminated on opposite axial end faces of said outer sleeve, respectively; and
   a deformation resistant portion provided for at least one of said pair of flange portions over a given circumferential length, said deformation resistant portion projecting axially outwardly to be opposed to and entirely axially spaced away from a member of said first component with a spacing therebetween,
   wherein during displacement of said inner sleeve relative to the outer sleeve toward a deformation resistant portion side, said at least one of said pair of flange portions provided with said deformation resistant portion undergoes elastic deformation toward said member of said first component due to compressive deformation of said main body portion in radial directions perpendicular to an axial direction of said bushing so that said deformation resistant portion comes into contact with said member of said first component to increase resistance to said compressive deformation of said main body portion.

2. A vibration damping bushing according to claim 1, wherein both of said pair of flange portions have said deformation resistant portion at respective circumferential positions corresponding to each other.

3. A vibration damping bushing according to claim 2, wherein said member of said first component comprises a bracket for mounting said inner sleeve on said first component, which has a pair of support portions laminated on opposite axial end faces of said inner sleeve interposed in between, respectively, and said deformation resistant portions come into contact with said support portions, respectively.

4. A vibration damping bushing according to claim 1, wherein said at least one of said pair of flange portions has an axial wall thickness that is made large at a predetermined circumferential position thereof over said given circumferential length so as to provide said deformation resistant portion protruding axially outward beyond axial end faces of said at least one of said pair of flange portions.

5. A vibration damping bushing according to claim 1, wherein said vibration damping bushing is of press fit type in which said elastic body is press fitted and secured at an outer circumferential surface thereof to an inner circumferential space of said outer sleeve.

6. A vibration damping bushing according to claim 1, wherein said deformation resistant portion is provided with a recess open in a protruding end face thereof.

7. A vibration damping bushing according to claim 6, wherein said deformation resistant portion is provided with a plurality of said recesses arranged in a circumferential direction of said at least one of said pair of flange portions at predetermined intervals.

8. A vibration damping bushing according to claim 1, wherein a radial wall thickness of said main body portion of said elastic body is made small on a side where said deformation resistant portion is provided.

9. A vibration damping bushing according to claim 8, wherein a center axis of said inner sleeve is eccentric relative to a center axis of said elastic body toward said side provided with said deformation resistant portion so that said radial wall thickness of said main body portion of said elastic body is made small on said side provided with said deformation resistant portion.

10. A vibration damping bushing according to claim 1, wherein said deformation resistant portion has a protruding end face extending parallel to a surface of said member of said first component, which surface is opposed to said protruding end face of said deformation resistant portion.

11. A vibration damping bushing according to claim 1, wherein said entire axial spacing between said member of the first component and the deformation resistant portion is smaller that an entire axial spacing between said member and an other portion of said at least one of said pair of flange portions where no deformation resistant portion is provided.

* * * * *